United States Patent [19]

Gail

[11] 3,871,587

[45] Mar. 18, 1975

[54] METHOD OF AND APPARATUS FOR SPREADING FERTILIZER

[76] Inventor: Josef Gail, 8891 Aichach, Unterwittelsbach, Germany

[22] Filed: May 30, 1973

[21] Appl. No.: 365,076

[30] Foreign Application Priority Data

May 31, 1972 Germany............................ 2226605

[52] U.S. Cl.................. 239/662, 239/664, 239/676, 239/141, 239/144, 239/156
[51] Int. Cl............................................ A01c 23/00
[58] Field of Search ........... 239/140, 141, 144, 657, 239/662, 675–677, 685, 664, 149, 156, 167, 163; 259/30, 170, 169, 175–177; 222/176, 178

[56] References Cited
UNITED STATES PATENTS

| | | | |
|---|---|---|---|
| 1,123,943 | 1/1915 | Soars .................... | 259/30 |
| 2,209,555 | 7/1940 | Beach et al............. | 239/685 X |
| 2,338,820 | 1/1944 | Peters .................... | 259/175 X |
| 2,401,431 | 6/1946 | Lewis..................... | 239/144 |
| 2,612,294 | 9/1952 | Dorschner .............. | 239/675 X |
| 2,883,166 | 4/1959 | Hilkemeier ............. | 259/169 X |
| 3,019,025 | 1/1932 | Young ..................... | 239/685 X |
| 3,356,261 | 12/1967 | Stein....................... | 239/156 X |
| 3,680,741 | 8/1972 | Barber..................... | 239/664 X |

*Primary Examiner*—Robert S. Ward, Jr.
*Assistant Examiner*—John J. Love
*Attorney, Agent, or Firm*—Karl F. Ross; Herbert Dubno

[57] ABSTRACT

A flowable fertilizer is loaded into the upper mouth of a mixing drum, of the concrete-mixer type, rotatable on a chassis about an axis inclined to the horizontal. This drum is then rotated about its axis to mix the fertilizer and form a blend of a composition specific to the region of application. When the region is reached, the direction of rotation is reversed to bring the mixture up and out the mouth through a door covering its mouth using worm or conveyor elevator formations normally present in a concrete-mixer drum. Below this door is a hopper emptying into two side-by-side spreaders each provided with a feed auger operated by a respective hydraulic motor in turn driven by a respective positive-displacement hydraulic motor rotated by the respective wheel of the chassis or otherwise hydraulically coupled therewith. Thus each spreader distributes the fertilizer at a rate dependent on the rotation speed of the respective wheel for even distribution uniform on curves or U-turns.

18 Claims, 4 Drawing Figures

METHOD OF AND APPARATUS FOR SPREADING FERTILIZER

FIELD OF THE INVENTION

The present invention relates to a mobile fertilizer mixer-spreader using a concrete-mixer drum.

BACKGROUND OF THE INVENTION

Various fertilizers are employed in agriculture in order to make the soil fit for certain crops and/or replace in the soil elements removed by continued farming. A multitude of different combinations of phosphates, potash, calcium cyanimides, lime, and the like are produced commercially for the various specific requirements. Such combinations are effective but expensive since they must be premixed for each particular plot, must be stored for long periods to await need and frequently become less desirable with time and changes in soil conditions. Commercially available mixes, having standardized ratios of available nitrogen, potash and phosphate are not desirable for many plots and the preparation of custom mixes by the farmer has not found widespread utility because of inconvenience.

OBJECTS OF THE INVENTION

It is therefore an object of the present invention to provide an improved fertilizing system.

Another object is the provision of an improved method of and apparatus for preparing a mixture and spreading it on the ground Yet another object is to provide an improved system for evenly distributing a mixture such as a fertilizer over the ground.

SUMMARY OF THE INVENTION

These objects are attained according to the present invention in an apparatus wherein a support chassis adapted to be moved along the ground carries a mixing drum of the concrete-mixing type rotatable about an axis inclined to the horizontal and formed with internal vanes and/or elevator or conveyor (worm) formations which, in one direction of rotation of the drum, mix material in the drum and, in the opposite rotation direction, advance the mixed material up and out of the drum. In addition to this cement-mixer structure the chassis carries a distributor for the mixed material which receives the mixture from the upper end of the drum and spreads it over the ground beneath the chassis. The drum is of the same construction and design as the drums of cement-mixer trucks, i.e., the vehicles used to mix and deliver ready-mix concrete.

According to another feature of this invention the mouth at the upper end of the drum is covered by a gate which is hinged on the chassis about a horizontal axis and lies with its weight on the mouth, whose rim lies in a plane perpendicular to the rotation axis of the drum. This gate is provided with an upwardly open input funnel and is formed with a hole at the base of the funnel covered by an inwardly deflectable flap. A spring is provided to hold the flap over the inside of the hole to prevent dust from escaping from the drum. When the rotational sense of the drum is reversed, the mixture in the drum rises to the mouth as is common with mixers of this type and deflects the gate upwardly enough to allow this mixture to pour out of the mouth into, according to another feature of this invention, a hopper communicating with distributors on the back of the chassis.

In accordance with yet another feature of the present invention, the hopper is provided with a high-level and a low-level detecting switch. The low-level detector automatically reverses the drum to fill the hopper when it senses that the hopper is nearly empty, and the high-level detector again reverses the drum (back into its mixing rotational sense) to stop filling the hopper when it detects that the hopper is full. The distributor-spreader includes at least one hollow conduit extending parallel to the ground and transverse to the transport direction. This conduit is formed with a plurality of downwardly opening holes and is provided with a feed auger or screw. The lower end of the hopper is connected to the conduit so that the mixture fills the conduit.

According to yet another feature of this invention the chassis has at least two ground-engaging wheels or other devices which detect the rate of advance of the chassis along the ground. These wheels are spaced apart transverse to the travel direction and are connected to respective distributor arrangements similarly spaced apart transverse to the transport direction. The quantity of material spread by each such spreader or distributor is made to depend on the rate of advance of a respective speed sensor associated with the wheels so that on cornering, for example, the spreader along the inner limb of the curve will distribute less material than the spreader along the outer limb so that the fertilizer coverage remains uniform. In the arrangement described above each wheel operates a respective positive-displacement hydraulic pump which is connected to a hydraulic motor operating the auger of a respective spreader conduit. As the wheel turns it operates the pump, supplying fluid to the respective motor at a rate exactly proportional to the rotation rate of the wheel. Alternatively, the hydraulic motor of the wheel is connected in series with the hydraulic motor of the associated auger across a common source, e.g., the pump.

Such an arrangement is extremely useful since it allows a farmer to custom-mix fertilizers from their relatively inexpensive constituents to match his exact needs. Once he has determined just what mixture a particular field requires, he need merely load the requisite ingredients into the drum and set it rotating in the mixing sense as the device is pulled or driven to the field in question. Then the sense of rotation is reversed (discharge sense) to fill the hopper and the mixture is spread at the desired rate. In addition an extremely uniform even coverage is possible with the device described, fertilizer burn which occurs at the corners or edges of the field is completely eliminated.

DESCRIPTION OF THE DRAWING

The above and other objects, features, and advantages of the present invention will become more readily apparent from the following description, reference being made to the accompanying drawing in which.

SPECIFIC DESCRIIPTION

Figure 1:
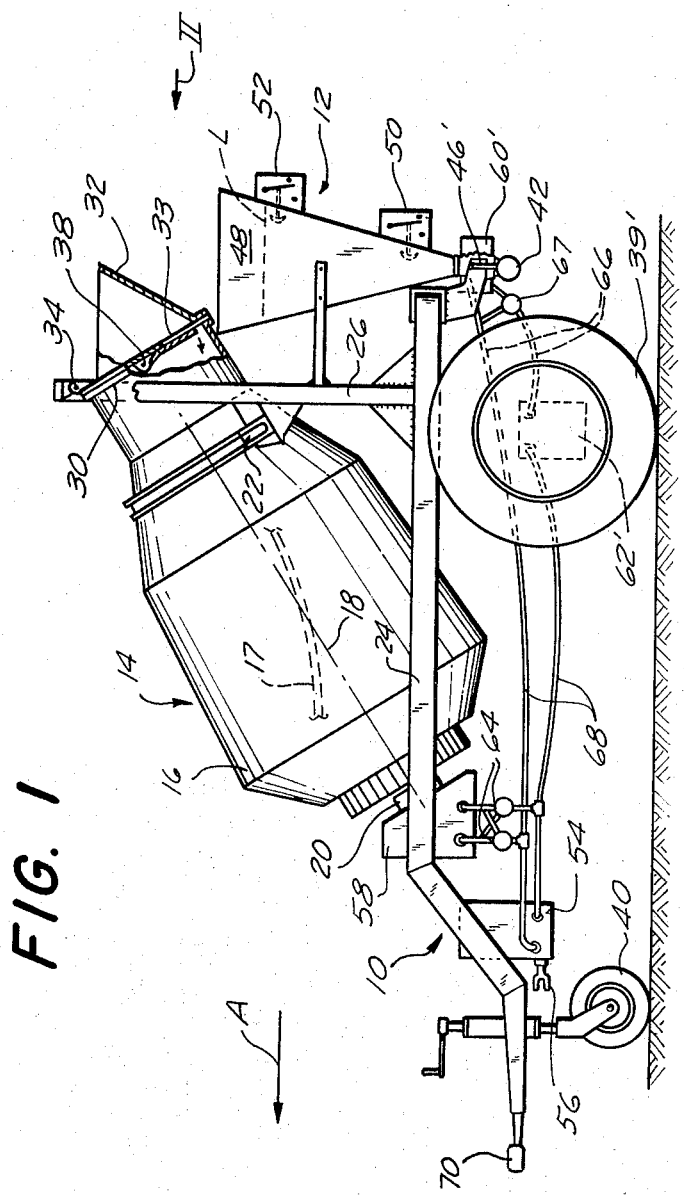
FIG. 1 is a side view of the device according to the present invention.
Figure 2:
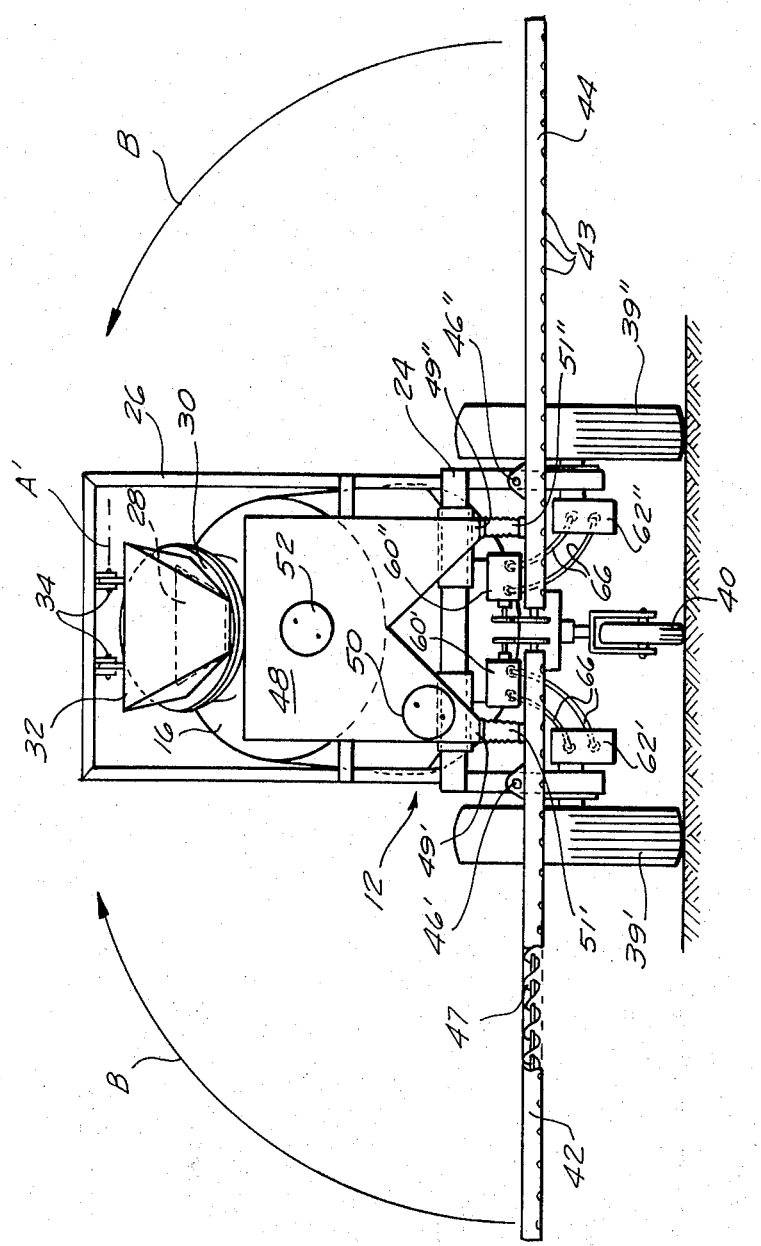
FIG. 2 is an end view, taken in the direction of arrow II of FIG. 1, of the device.

As shown in FIGS. 1 and 2 a vehicle 10 adapted to move along the ground in a direction A carries at its rear end a fertilizer spreader 12 and in front of this a mixer 14. This mixer 14 comprises a concrete-mixer drum 16 formed with internal vanes lying along one or more helices as shown at 17 or an auger and is rotatable about an axis 18 lying at an angle to the horizontal and in a plane parallel to the transport direction A. At its lower front end the drum 16 is supported in a bearing and at its upper rear end in a bearing 22 which is supported on a frame 26 built on the back of the chassis 24 of the vehicle and also supporting the spreader 12.

The upper end of the drum 16 is formed with an open mouth 28 which is normally covered by a door or gate 30 pivoted at 34 about a horizontal axis A' perpendicular to the transport direction A and above the drum 16. In addition this axis A' lies in front of the mouth 28 so that the door 30 normally lies over and completely covers the mouth 28, a seal being provided if desired. The door 30 is formed with an upwardly open filling funnel 32 and with a hole 33 covered by a flap 36 hinged on the inside of this door about a horizontal axis 38 and urged against the inside of this door 30 by a spring 37. This hole 33 is at the base of the funnel 32 so that material poured into this funnel pushes the door 36 in and enters the top of the drum 16. Rotation of this drum in one direction about its axis by a hydraulic motor 58 mixes material poured into it while rotation in the opposite direction moves the mixture axially upwardly and out the mouth 28, pushing the door 30 open by pivoting it upwardly about its axis A'.

Below the mouth 28 of the drum 16 there is provided an upwardly open hopper 48 having two downwardly opening outlets 49' and 49" connected via accordion-like extensible cuffs 51' and 51" to perforated spreader arms 42 and 44 pivotal about respective axes 46' and 46" parallel to the direction A and spaced apart transverse to this direction. These arms are therefore arranged symmetrically to a vertical plane parallel to the direction A. The inner end of each arm 42 and 44 carries a respective hydraulic motor 60' and 60" which drives an auger 47 in each arm. Thus material from the hopper 48 is fed into the arms 42 and 44 and distributed therealong whence it falls onto the ground through the perforations 43 in these arms. The arms are shown in FIG. 2 in their operative position for field spreading. They can be pivoted up as shown by the arrows B for road transport of the device and secured in this lifted position.

The vehicle has a singel front wheel 40 and two back wheels 39' and 39". In addition it has a drive pump 54 connectable via a shaft 56 to the power takeoff of a tractor connectable to the trailer 10 to 70. This pump 54 is connected to the motor 58 by hydraulic lines 64 and to hydrostatic motors 62' and 62" or flow regulators connected to the wheels 39' and 39". Lines 66 connect the gear pumps 62' and 62" to the variable-displacement hydraulic motors 60' and 60" operating the augers 47. When the vehicle is hydraulically driven, the motors 62', 62" are traversed by fluid at a rate which determines vehicle speed so that the hydraulic auger 60',60" motors are driven proportionally. When the apparatus is powered otherwise or is towed, devices 62', 62" act as flow-regulating pumps supplying the motors 60', 60" at a rate determined by the ground coverage.

Figure 4:
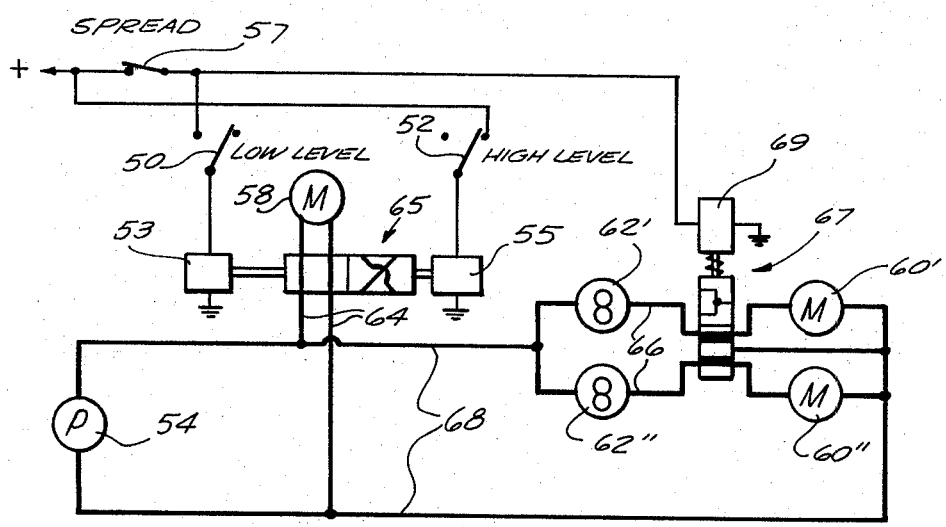
FIG. 4 is a schematic diagram showing the hydraulic-electric control system for the present invention.

The device is operated as follows, references being made to the diagram of FIG. 4. First the various fertilizer ingredients are poured into the funnel 32 whence they push the flap 36 in and enter the drum 16. The vehicle power takeoff is set in motion and the motor 58 is made to rotate in the mixing direction by means of the pump 54. While the mixing is being done the trailer 10 is pulled to the field to be fertilized.

The hopper 48 is provided with a pair of level detecting switches 50 and 52. When the level in hopper 48 is above the lower switch 50 this switch is opened, the upper switch 52 being closed when the level is thereabove. In the drawing the switches are shown in the position they would assume if the hopper were full to a level L above the upper switch 52. A bistable reversing valve 65 in the lines 64 between the pump 54 and the motor 58 is operated by a pair of solenoids 53 and 55, operated respectively by the low-level switch 50 and the high-level switch 52. Another valve 67 operated by a spring-loaded solenoid 69 is connected along ith the front contact of the switch 50 to a SPREAD switch 57 whose other side is connected to a source of electricity. This source is also connected to the back contact of the switch 52. Until the SPREAD switch 57 is closed the valve 67 is held in a position shunting the output of the motors 62' and 62" bakc to the pump 54 rather than through the motors 60' and 60".

When mixing is complete and the machine is on the distribution site the arms 42 and 44 are rotated down into place and locked there, and the SPREAD switch is closed to actuate the solenoid 69 and connect each motor 60' and 60" to its motor 62' and 62", and to actuate the solenoid 53 through the closed switch 50 to reverse the motor 58 and set the drum rotating in its emptying direction. The bistable valve 65 remains in position until the high-level switch is closed, whereupon the valve 65 is again switched over and to set the drum rotating in the mix direction. When the level drops below the switch 50 again this direction will again be reversed.

Meanwhile as the trailer 10 is displaced along the ground each motor 60' and 60" will rotate its auger at a speed dependent on the rotation speed of its respective wheel 39' and 39". In this manner varying displacement speed in a straight line will still give even coverage, and when the vehicle corners the inside spreader, since its wheel will rotate more slowly, will emit less fertilizer. Almost perfect uniformity of coverage is obtained. The motors 60' and 60" are axial-piston motors whose swash-plate angles are set to establish ovoerall spreading rate.

Figure 3:
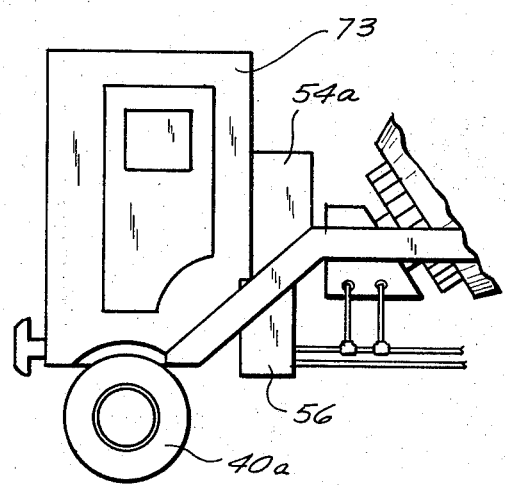
FIG. 3 is a view showing an alternative embodiment of this invention.

FIG. 3 shows how instead of a trailer 10, a fully self-propelled vehicle 10a may have a motor 56a connected directly to the pump 54, with the hydraulic flow driving the back wheels and the augers being connected in series with the wheel-driving motors. Front wheels 40a serve to guide the vehicle and a cab 73 is provided to protect the operator from the weather.

The trailer 10 of FIGS. 1 and 2 may be simple cement mixer which is equipped with a removable spreader 12 for use as a fertilizer. The unit 12 can be made easily removable.

I claim:
1. A fertilizing apparatus comprising:
a chassis displaceable along the ground;

a concrete-mixer type drum on said chassis having an upper end formed with a mouth;

support means on said chassis for rotation of said drum about an axis inclined to the horizontal;

drive means on said chassis for rotating said drum about said axis in one sense for mixing material in said drum and in the opposite sense for displacing the mixed material out of said mouth;

spreader means on said chassis adjacent said mouth and including at least one horizontal member extending transverse to the direction of displacement of said chassis for distributing the material emitting from said mouth on the ground at a multiplicity of spaced locations along said member;

a flat gate hinged on said chassis above said mouth and overlying same, said gate being provided with an upwardly open funnel and being formed at the base of said funnel with a hole ; and a flap hinged to said gate and normally covering said hole on the face of said gate away from said funnel, and spring means urging said flap into a position covering said hole.

2. The fertilizing apparatus defined in claim 1 wherein said chassis is provided with at least one ground-engaging wheel, said horizontal member comprises a duct provided with downwardly directed spaced-apart openings, and said spreader means includes an auger in said duct and a hydraulic motor connected to said auger, said apparatus further comprising a source of hydraulic medium, and flow-control means connected in circuit between said source and said hydraulic motor.

3. The apparatus defined in claim 2 wherein said spreader means comprises a pair of such spreading ducts disposed on opposite sides of a vertical longitudinal median plane through said chassis, each of said ducts being provided with one such auger and a respective hydraulic motor driving same, said chassis being formed with a hopper communicating with said mouth and leading to said ducts in the vicinity of said plane, said chassis being formed with two such wheels on opposite sides of said plane, each operatively connected to a respective flow-control device in a hydraulic circuit between said source and the respective hydraulic motor whereby the fertilizer is discharged from said ducts at rates determined by the rate of rotation of the respective wheel.

4. The apparatus defined in claim 3 wherein each of said devices is a hydraulic pump.

5. The apparaatus defined in claim 3 wherein each of said device is a hydraulic motor driving the respective wheel.

6. The apparatus defined in claim 3 wherein said source is a hydraulic pump and said drive means includes a hydraulic motor operatively connected to said drum and in fluid communication with said pump.

7. The apparatus defined in claim 6 wherein said hydraulic motor of said drive means is a hydrostatic motor.

8. The apparatus defined in claim 1, further comprising a prime mover on said chassis for the self-propulsion thereof.

9. The apparatus defined in calim 1 wherein said spreader means is movably mounted on said chassis.

10. A fertilizing apparatus comprising:
a chassis displaceable along the ground;

a concrete-mixer-type drum on said chassis having an upper end formed with a mouth;

support means on said chassis for rotation of said drum about an axis inclined to the horizontal;

drive means on said chassis for rotating said drum about said axis in one sense for mixing material in said drum and in the opposite sense for displacing the mixed material out of said mouth;

spreader means on said chassis adjacent said mouth and including at least one horizontal member extending transverse to the direction of displacement of said chassis for distributing the material emitting from said mouth on the ground at a multiplicity of spaced locations along said member; said spreader including a hopper for holding a quantity of said material and a perforated element connected to said hopper for distributing said material on the ground; and a level sensor in said hopper and control means connected to said sensor and to said drive means for rotating said drum in said one sense for mixing on the level of material in said hopper being above said sensor and for rotating said drum in said opposite sense on said level dropping below said sensor.

11. The fertilizing apparatus defined in claim 10 wherein said chassis is provided with at least one ground-engaging wheel, said horizontal member comprises a duct provided with downwardly directed spaced-apart openings, and said spreader means includes an auger in said duct and a hydrailic motor connected to said auger, said apparatus further comprising a source of hydraulic medium, and flow-control means connected in circuit between said source and said hydraulic motor.

12. The apparatus defined in claim 11 wherein said spreader means comprises a pair of such spreading ducts disposed on opposite sides of a vertical longitudinal median plane through said chassis, each of said ducts being provided with one such auger and a respective hydraulic motor driving same, said chassis being formed with a hopper communicataing with said mouth and leading to said ducts in the vicinity of said plane, said chassis being formed with two such wheels on opposite sides of said plane, each operatively connected to a respective flow-control device in a in a hydraulic circuit between said source and the respective hydraulic motor whereby the fertilizer is discharged from said ducts at rates determined by the rate of rotation of the respective wheel.

13. The appartus defined in claim 12 wherein each of said devices is a hydraulic pump.

14. The apparatus defined in claim 12 wherein each of said devices is a hydraulic motor driving the respective wheel.

15. The apparatus defined in claim 12 wherein said source is a hydraulic pump and said drive means includes a hydraulic motor operatively connected to said drum and in fluid communication with said pump.

16. The apparatus defined in claim 15 wherein said hydaulic motor of said drive means is a hydrostatic motor.

17. The apparatus defined in claim 10, further comprising a prime mover on said chassis for the self-propulsion thereof.

18. The apparatus defined in claim 10, wherein said spreader means is removably mounted on said chassis.

* * * * *